Patented Aug. 6, 1929.

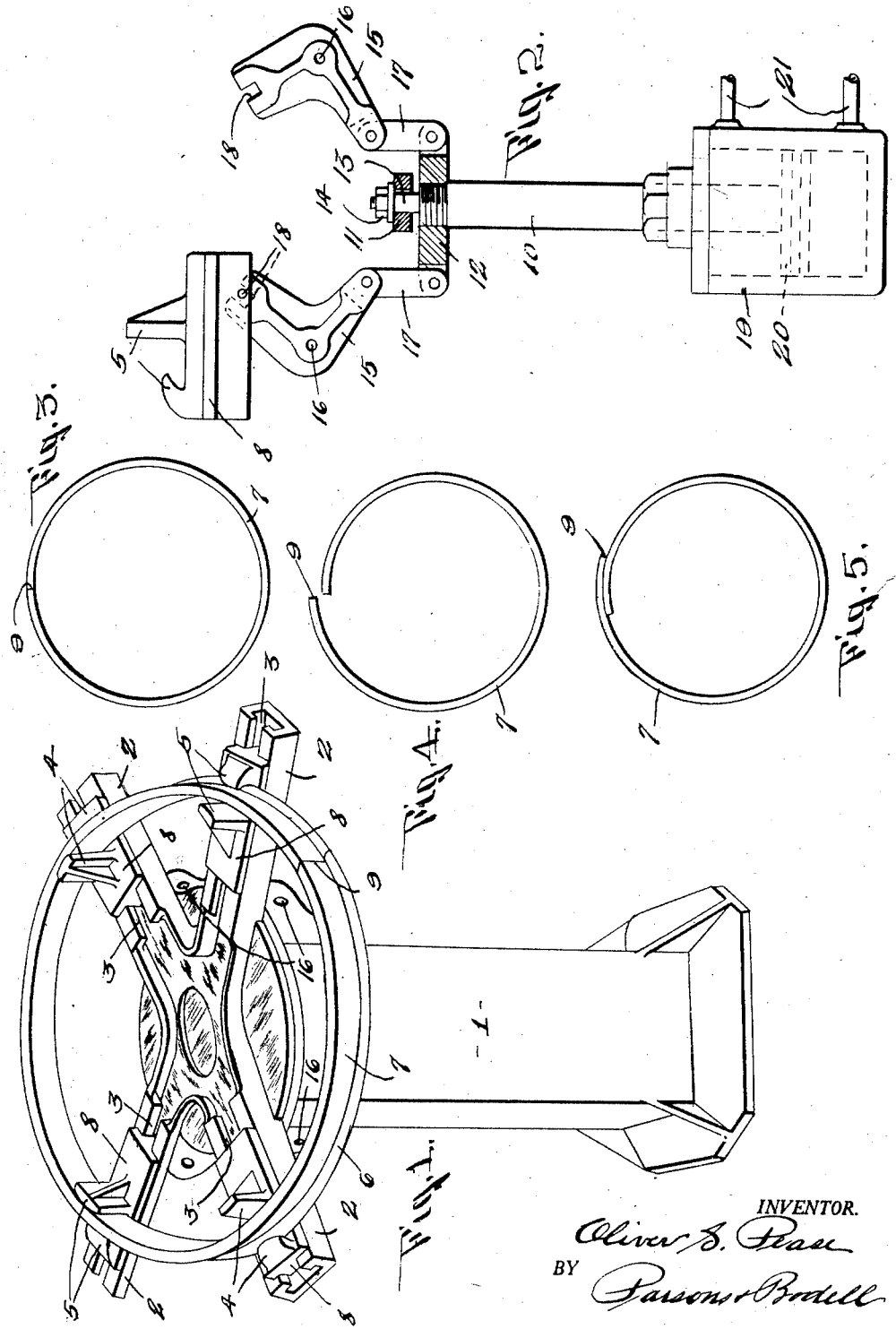

1,723,559

UNITED STATES PATENT OFFICE.

OLIVER S. PEASE, OF LIVERPOOL, NEW YORK.

SPLIT TIRE-RIM CONTRACTING AND EXPANDING MACHINE.

Application filed January 13, 1927. Serial No. 160,993.

This invention has for its object a machine for contracting and expanding split tire rims for the purpose of readily removing or replacing tires thereon, and especially a machine which is in use continually or during a considerable portion of the working hours to assemble new tires on new rims in automobile factories; and it has for its object a particularly simple and efficient mechanism for actuating the jaws of the machine successively to break the joint of the rim preliminary to contracting the rim and expanding the rim from its contracted position after the tire has been placed thereon to again form the joint with the ends of the split rim in abutting relation.

The invention consists in the novel features and in the combinations and constructions hereinafter set forth and claimed.

In describing this invention reference is had to the accompanying drawings in which like characters designate corresponding parts in all the views.

Figure 1 is a perspective view of a split tire rim contracting and expanding machine embodying my invention.

Figure 2 is a fragmentary detail view parts being removed of the actuating mechanism.

Figures 3, 4 and 5 are diagrammatic views illustrating respectively the operation performed on a rim by this machine when contracting the rim to place a tire thereon or remove a tire therefor, the operations to expand the rim being in the reverse order. Although this machine is illustrated as a power machine many of the features thereof can be used in a machine which is not operated by power. This split tire rim contracting and expanding machine comprises, generally, a frame, a plurality of rim engaging jaws carried by the frame and movable in radial directions toward and from a common center, and means for moving the jaws comprising mechanism for moving one pair of jaws in advance of others when contracting the rim in order to first break the joint of the rim. The frame may be of any suitable form, size and construction, it being here shown as comprising a standard 1, having radially extending arms 2, here shown as four in number, at its upper end and each arm being formed with a guide or way 3.

4 and 5 designate respectively the pairs of jaws, there being two pairs of jaws 4 located diametrically opposite each other and also two pairs of jaws 5 located diametrically opposite each other. These jaws are stationary with respect to each other as will be understood by those skilled in the art, and the outer jaw is shaped to engage one only of the flanges as 6 of the rim 7 while the tire is on the rim, and the other jaw is shaped to engage the inner surface of the rim, that is to shoulder against the same. Each pair of jaws is carried by a slide 8 movable in one of the guides 3.

The means for actuating the jaws in radial directions, that is for moving the slides 8 along the guides 3 comprises an actuator or prime mover and motion transmitting connections between the actuator and the jaws 4 and between the actuator and the jaws 5, one set of these connections including a lost motion connection whereby one set of jaws as the jaws 5 and particularly the jaw 5 located near the split 9 of the rim will be first contracted inwardly to break the joint of the rim. The actuator, as here shown, is reciprocally movable centrally of the frame or along the axis of the radii of the slides 8, and as, usually, the arms 2 are arranged in a horizontal plane the actuator moves in a vertical plane or in a direction at a right angle to the plane of the supporting arms 2. The actuator is here shown as a rod 10 movable vertically within the standard 1.

The connections between the rod 10 and the jaws 4 and 5 comprises cross heads 11 and 12, one cross head being fixed to the rod 10 or secured thereto in such a manner as to partake of the full reciprocating movement thereof, and the other cross head being slidably connected to the actuator 10 to have a limited relative movement or so that the actuator 10 and cross head 11 have a limited movement relatively to the cross head 12. These cross heads are arranged at a right angle to each other and the cross head 12 is here shown as threaded on the actuator 10 while the cross head 11 is shown as arranged above the cross head 11 on a reduced portion 13 of the rod 10, and moves between a shoulder or nut 14 threading on the end of the reduced portion and the end surface of the enlarged portion of the rod 10.

The opposite ends of the cross head 11 are connected to the jaws 4 and the opposite ends of the cross head 12 are connected to the jaws 5 by suitable motion transmitting mechanism, here shown as levers 15 preferably angle levers pivoted at their angles at 16 to the frame, one arm of each lever being connected to one of the slides 8 and the other arm of each lever being connected by a link 17 to one end of the companion cross head 11 or 12. The levers 15 are connected to the slides 8 by a pin-and-slot connection 18.

The actuator 10 is itself actuated by power means as a cylinder 19 mounted in the base or standard and a piston 20 movable in the cylinder, the piston rod being preferably the actuator 10 or an extension thereof. Motive fluid to and from the cylinder is controlled in any suitable manner through pipes as 21 and as any well known form of control means may be used, it is thought that a description of such controlled means is unnecessary.

In operation the rim either with or without a tire thereon is placed on the arms 2 between the jaws 4, 5 and assuming for the sake of illustration that a tire is to be placed on a new rim as in automobile factories, the rim is first arranged with a split 9 thereof near one of the jaws 5, as shown in Figure 1, and the air or other fluid admitted into the top of the cylinder to pull the actuator 10 downwardly, thus first pulling down on the cross head 12 to break the joint of the rim or to actuate the rim from the position shown in Figure 3 to that shown in Figure 4. Thereafter the lost motion is taken up between the nut 14 and the cross head 11 so that the cross head 11 now moves the jaws 4 inwardly to cooperate with the jaws 5 to contract the rim into the position shown in Figure 5 in which position the tire can be readily placed on the rim. The reverse of this operation again expands the rim until the ends at the joint thereof move into abutting relation under the resiliency of the inwardly deflected end.

What I claim is:—

1. A split tire rim contracting and expanding machine comprising a frame, a plurality of pairs of rim engaging jaws carried by the frame, means for moving the jaws in radial directions including a prime mover carried by the frame, and motion transmitting members connected to the prime mover, one of said motion transmitting members being connected to one pair of the jaws, and another member being connected to others of the jaws, and one of said members being connected to the prime mover by a lost motion connection and the other member connected to move directly therewith, whereby said members and jaws connected thereto are operated in sequence.

2. A split tire rim contracting and expanding machine comprising a frame, a plurality of pairs of rim engaging jaws carried by the frame, means for moving the jaws in radial directions comprising a reciprocable prime mover, a motion transmitting member connected to the prime mover to partake of the full effective movement thereof, connections between said motion transmitting member and some of the jaws and an additional member connected to the prime mover by a lost motion connection and connections between the additional member and the other of the jaws.

3. A split tire rim contracting and expanding machine comprising a frame, a plurality of pairs of rim engaging jaws carried by the frame, means for moving the jaws in radial directions comprising a reciprocating prime mover, a cross head mounted on the prime mover to partake of the full movement thereof, a second cross head slidably mounted on the prime mover and having a limited sliding movement whereby there is lost motion between the two cross heads, connections between the first cross head and some of the jaws and connections between the other cross head and others of the jaws.

4. In a split tire rim contracting and expanding machine comprising a frame formed with radially extending guides, slides mounted in the guides and a pair of rim engaging jaws carried by each slide, a centrally mounted and vertically reciprocable actuator and motion transmitting connections between the actuator and the slides, said connections comprising levers pivoted to the frame, one lever for each slide, one arm of each lever being pivotally connected to one of the slides, cross heads carried by the prime mover, links connecting the cross heads and the other arms of the levers, one of the cross heads being fixed to the actuator and the other slidably mounted therein with a limited lost motion connection.

5. A split tire rim contracting and expanding machine comprising a frame, a plurality of pairs of rim engaging jaws carried by the frame for engaging the rim, means for moving the jaws in radial directions comprising a prime mover, cross heads mounted on the prime mover, motion transmitting means between each cross head and the jaws of one pair comprising levers pivoted to the frame, each angle lever having one arm thereof pivotally connected to one jaw of the companion pair of jaws and its other arm pivotally connected to the companion cross head.

6. A split tire rim contracting and expanding machine comprising a frame, rim engaging jaws carried by the frame, means for moving the jaws in radial directions comprising a reciprocating prime mover, connections between the prime mover and one of the jaws including a lost motion connection.

In testimony whereof, I have hereunto signed my name, at Liverpool, in the county of Onondaga, and in the State of New York, this 21st day of December, 1926.

OLIVER S. PEASE.